United States Patent
Pan

(10) Patent No.: US 10,284,265 B2
(45) Date of Patent: *May 7, 2019

(54) METHOD AND APPARATUS FOR EFFICIENT PRECODING INFORMATION VALIDATION FOR MIMO COMMUNICATIONS

(71) Applicant: InterDigital Technology Corporation, Wilmington, DE (US)

(72) Inventor: Kyle Jung-Lin Pan, Saint James, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,508

(22) Filed: Jun. 19, 2017

(65) Prior Publication Data

US 2017/0294944 A1 Oct. 12, 2017

Related U.S. Application Data

(63) Continuation of application No. 12/106,581, filed on Apr. 21, 2008, now Pat. No. 9,716,604.

(Continued)

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0652* (2013.01); *H04B 7/0665* (2013.01);
(Continued)

(58) Field of Classification Search
CPC .. H04B 7/0417; H04B 7/0632; H04B 7/0652; H04B 7/0665; H04B 7/0456;
(Continued)

(56) References Cited

U.S. PATENT DOCUMENTS 7,729,442 B2 6/2010 Kim
7,809,074 B2 10/2010 Kotecha et al.
(Continued)

FOREIGN PATENT DOCUMENTS

CN 1773885 1/2010
KR 2006-0038812 5/2006
(Continued)

OTHER PUBLICATIONS

"Chinese Office Action", Chinese Application No. 200880012836.6, dated Sep. 6, 2013, 7 Pages.
(Continued)

*Primary Examiner* — Sung S Ahn
(74) *Attorney, Agent, or Firm* — Eric Berkowitz

(57) ABSTRACT

A method and apparatus for efficient precoding matrix verification in a multiple-input multiple-output MIMO wireless communication system are disclosed. A wireless transmit/receive unit WTRU sends a precoding matrix index PMI to an eNodeB. The eNodeB sends a verification message including a PMI indicator indicating whether or not the PMI of the WTRU and a PMI of the eNodeB are identical. If the PMI of the WTRU and of the eNodeB are identical, the eNodeB sends just a PMI indicator otherwise the eNodeB sends to the WTRU a PMI indicator and the PMI of the eNodeB. A plurality of PMIs may be sent simultaneously, and the PMIs may be partitioned into a plurality of groups. The PMI indicator may be either attached to or inserted into control signaling. PMI validation messages can be signaled to WTRU by control signaling or use of a dedicated reference signal.

11 Claims, 8 Drawing Sheets

Related U.S. Application Data

(60) Provisional application No. 60/913,145, filed on Apr. 20, 2007.

(51) Int. Cl.
*H04L 1/00* (2006.01)
*H04L 1/16* (2006.01)
*H04L 25/03* (2006.01)

(52) U.S. Cl.
CPC .......... *H04L 1/0025* (2013.01); *H04L 1/0029* (2013.01); *H04L 1/0072* (2013.01); *H04L 1/1671* (2013.01); *H04L 25/03343* (2013.01); *H04L 2025/03414* (2013.01); *H04L 2025/03426* (2013.01); *H04L 2025/03802* (2013.01)

(58) Field of Classification Search
CPC ... H04L 1/0025; H04L 1/0029; H04L 1/0072; H04L 1/1671
See application file for complete search history.

(56) References Cited

U.S. PATENT DOCUMENTS

| | | | |
|---|---|---|---|
| 8,259,824 | B2 | 9/2012 | Varadarajan et al. |
| 8,472,547 | B2 | 6/2013 | Hammarwall et al. |
| 8,531,958 | B2 | 9/2013 | Sivanesan et al. |
| 8,626,081 | B2 | 1/2014 | Goransson et al. |
| 9,716,604 | B2 * | 7/2017 | Pan ..................... H04B 7/0417 |
| 2003/0148738 | A1 | 8/2003 | Das et al. |
| 2003/0148770 | A1 | 8/2003 | Das et al. |
| 2003/0148773 | A1 | 8/2003 | Spriestersbach et al. |
| 2005/0037718 | A1 | 2/2005 | Kim et al. |
| 2006/0035643 | A1 | 2/2006 | Vook et al. |
| 2006/0098568 | A1 | 5/2006 | Oh et al. |
| 2006/0153112 | A1 | 7/2006 | Lim et al. |
| 2007/0165738 | A1 | 7/2007 | Barriac et al. |
| 2007/0220151 | A1 | 9/2007 | Li et al. |
| 2007/0223423 | A1 | 9/2007 | Kim et al. |
| 2007/0263746 | A1 | 11/2007 | Son |
| 2008/0013610 | A1 | 1/2008 | Varadarajan et al. |
| 2008/0037675 | A1 | 2/2008 | Lin et al. |
| 2008/0043867 | A1 * | 2/2008 | Blanz ..................... H04B 7/063 375/260 |
| 2008/0186934 | A1 | 8/2008 | Khan et al. |
| 2008/0187030 | A1 * | 8/2008 | Khan ..................... H04B 7/0417 375/219 |
| 2008/0188190 | A1 | 8/2008 | Prasad |
| 2008/0232503 | A1 | 9/2008 | Kim |
| 2008/0247488 | A1 | 10/2008 | Li et al. |
| 2008/0310353 | A1 | 12/2008 | Love et al. |
| 2008/0310356 | A1 | 12/2008 | Zhijun et al. |
| 2009/0122857 | A1 | 5/2009 | Li et al. |
| 2009/0219838 | A1 | 9/2009 | Jia et al. |
| 2009/0238256 | A1 | 9/2009 | Onggosanusi |
| 2009/0296844 | A1 | 12/2009 | Ihm et al. |
| 2009/0323840 | A1 | 12/2009 | Lee et al. |
| 2010/0183085 | A1 | 7/2010 | Taoka |
| 2013/0163545 | A1 | 6/2013 | Taoka et al. |
| 2014/0023154 | A1 | 1/2014 | Rajagopal et al. |

FOREIGN PATENT DOCUMENTS

| | | |
|---|---|---|
| RU | 2292116 | 1/2007 |
| WO | WO-02/093784 | 11/2002 |
| WO | WO-2004/110081 | 12/2004 |
| WO | WO-2006/036052 A2 | 4/2006 |
| WO | WO-2006/049417 A1 | 5/2006 |
| WO | WO-2006/107835 A1 | 10/2006 |
| WO | WO-2008/031037 A2 | 3/2008 |
| WO | WO-2008/156067 | 12/2008 |

OTHER PUBLICATIONS

"Chinese Office Action (English Translation)", Chinese Application No. 200880012836.6, dated Sep. 6, 2013, 9 Pages.
"European Office Action", European Patent Application No. 08 780 554.5-1237, dated Oct. 13, 2010, 5 pages.
"European Search Report", European Application No. 12188412.6, dated Apr. 3, 2013, 12 Pages.
"Extended European Search Report", European Application No. 14173804.7, dated Oct. 9, 2014, 8 Pages.
"Japanese Notice of Allowance", Japanese Application No. 2015-213185, dated Aug. 9, 2016, 3 pages.
"Japanese Notice of Allowance (English Translation)", Japanese Application No. 2015-213185, dated Aug. 9, 2016, 3 pages.
"Japanese Notice of Rejection", Japanese Application No. 2014-019754, dated Feb. 17, 2015, 6 pages.
"Japanese Notice of Rejection (English Translation)", Japanese Application No. 2014-019754, dated Feb. 17, 2015, 6 pages.
"Japanese Official Notice of Rejection", Japanese Patent Application No. 2010-504310, dated Apr. 20, 2012, 3 pages.
"Japanese Official Notice of Rejection (Translation)", Japanese Patent Application No. 2010-504310, dated Apr. 20, 2012, 3 pages.
"Korean Office Action", Korean Patent Application No. 10-2009-7023622, dated Apr. 26, 2012, 4 pages.
"Korean Office Action (Translation)", Korean Patent Application No. 10-2009-7023622, dated Apr. 26, 2012, 4 pages.
"Singapore Search and Examination Report", Singapore Application No. 10201503104P, dated Aug. 1, 2016, 5 pages.
"Taiwanese Office Action", Taiwanese Application No. 103122176, dated Jun. 15, 2015, 3 pages.
"Taiwanese Office Action (English Translation)", Taiwanese Application No. 103122176, dated Jun. 15, 2015, 1 page.
"United States Final Office Action", U.S. Appl. No. 12/106,581, dated Jul. 28, 2016, 10 pages.
"United States Final Office Action", U.S. Appl. No. 12/106,581, dated Jul. 5, 2012, 14 pages.
"United States Non-Final Office Action", U.S. Appl. No. 12/106,581, dated Dec. 22, 2011, 34 pages.
"United States Notice of Allowance", U.S. Appl. No. 12/106,81, dated Dec. 16, 2016, 10 pages.
"United States Office Action", U.S. Appl. No. 12/106,581, dated Jan. 20, 2016, 11 pages.
"United States Office Action", U.S. Appl. No. 12/106,581, dated Mar. 27, 2015, 15 pages.
"United States Office Action", U.S. Appl. No. 12/106,581, dated May 7, 2014, 15 pages.
Ericsson, "Rank Override Support for Precoder Confirmation", 3GPP Tdoc R1-081540, 3GPP TSG-RAN WG1 #52bis, Shenzhen, China, Mar. 31-Apr. 4, 2008, 3 pages.
Huawei, "On the precoding feedback granularity for DL MIMO", 3GPP Tdoc R1-070120; 3GPP TSG RAN WG1 Meeting #47bis; Sorrento, Italy, Jan. 15-20, 2007 (allegedly published on Jan. 10, 2007), 6 pages.
Huawei, "Overhead reduction of UL CQI signalling for E-UTRA DL", 3GPP Tdoc R1-062491; 3GPP TSG RAN WG1 Meeting #46bis, Seoul, Korea, Oct. 9-13, 2006, 6 pages.
Huawei, "Overheard Reduction of UL CQI Signalling for E-UTRA DL", 3GPP TSG RAN LTE Ad Hoc; Cannes, France; R1-061819, Jun. 2006, 10 Pages.
Huawei, "Standardization of MU-MIMO", 3GPP Tdoc R1-071412; TSG RAN WG1 meeting #48bis, St Julian, Malta, Mar. 26-30, 2007, 3 pages.
Kim, Young M., et al., "Multi-Adaptive FH Spread Spectrum System for Wireless High Data Rate Multimedia Services", 2000 IEEE 51st Vehicular Technology Conference Proceedings, VTC 2000—Spring, vol. 2, May 2000, 5 pages.
LG Electronics, "MIMO Related L1/L2 Control Channel—Dedicated PMI Signaling", 3GPP Tdoc R1-071557, 3GPP TSG RAN WG1 Meeting #48bis, St. Julian, Malta, Mar. 26-30, 2007, 3 pages.

(56) References Cited

OTHER PUBLICATIONS

Motorola, "PMI Downlink Signaling and Downlink PDCCH Format", 3GPP Tdoc R1-073077; 3GPP TSG RAN1 Meeting #49bis; Orlando, USA, Jun. 25-29, 2007, 3 pages.
Motorola, "Precoding Matrix Feedback BER Requirements", 3GPP Tdoc R1-071712, 3GPP TSG RAN WG1, St. Julian, Malta, Mar. 26-30, 2007, 3 Pages.
NTT Docomo, et al., "Investigation on PMI Indication Schemes for Single-User MIMO Precoding in E-UTRA Downlink", 3GPP Tdoc R1-080248, 3GPP TSG RAN WG1 Meeting #51bis, Sevilla, Spain, Jan. 14-18, 2008, 8 pages.
Qualcomm Europe, "Analysis of Precoding codebook size", 3GPP Tdoc R1-062030, 3GPP TSG-RAN WG1 #46, Tallin, Estonia, Aug. 28-Sep. 1, 2006, 5 Pages.
Samsung, et al., "Codebook design for 4Tx SU MIMO", 3GPP Tdoc R1-072235, 3GPP TSG RAN WG1 Meeting #49, Kobe, Japan, May 7-11, 2007, 17 pages.
Samsung, "Downlink Signaling for Support of a Single-User MIMO", 3GPP TSG RAN WG1 Meeting #48bis; St. Julian's, Malta; R1-071569, Mar. 2007, 4 Pages.
Samsung, "Signaling for Support of SU-MIMO in the Downlink", 3GPP TSG RAN WG1 Meeting #48; St. Louis Missouri; R1-070947, Feb. 2007, 4 Pages.
Texas Instruments, "Aspects of Codebook-based Pre-coding for E-UTRA MIMO", 3GPP Tdoc R1-063238, 3GPP TSG RAN WG1 Meeting #47, Riga, Latvia, Nov. 6-10, 2006, 3 pages.
Texas Instruments, "Feedback reduction for rank-1 pre-coding for E-UTRA downlink", 3GPP TSG RAN WG1 #45, R1-061441, Athens, Greece, May 8-12, 2006, 5 pages.
ZTE, "Considerations on DL Signaling for Support of SU- and MU-MIMO", 3GPP Tdoc R1-074225; 3GPP TSG-RAN WG1 Meeting #50bis, Shanghai, China, Oct. 8-12, 2007 (allegedly published on Oct. 2, 2007), 3 pages.
Ericsson, et al., "Refinements on Signalling of CQI/Precoding Information on PDCCH", 3GPP Tdoc R1-081682; 3GPP TSG-RAN WG1 #52bis, Shenzhen, China, Mar. 31-Apr. 4, 2008, 4 pages.
Interdigital Communications, LLC, "Binary Differential Feedback Using Existing Codebooks for E-UTRA", 3GPP Tdoc R1-073352; 3GPP TSG RAN WG1 Meeting #50, Athens, Greece, Aug. 20-24, 2007, 14 pages.
Motorola, "PMI Downlink Signaling and PDCCH Format", 3GPP Tdoc R1-073378; 3GPP TSG RAN1 Meeting #50; Athens, Greece, Aug. 20-24, 2007, 3 pages.

\* cited by examiner

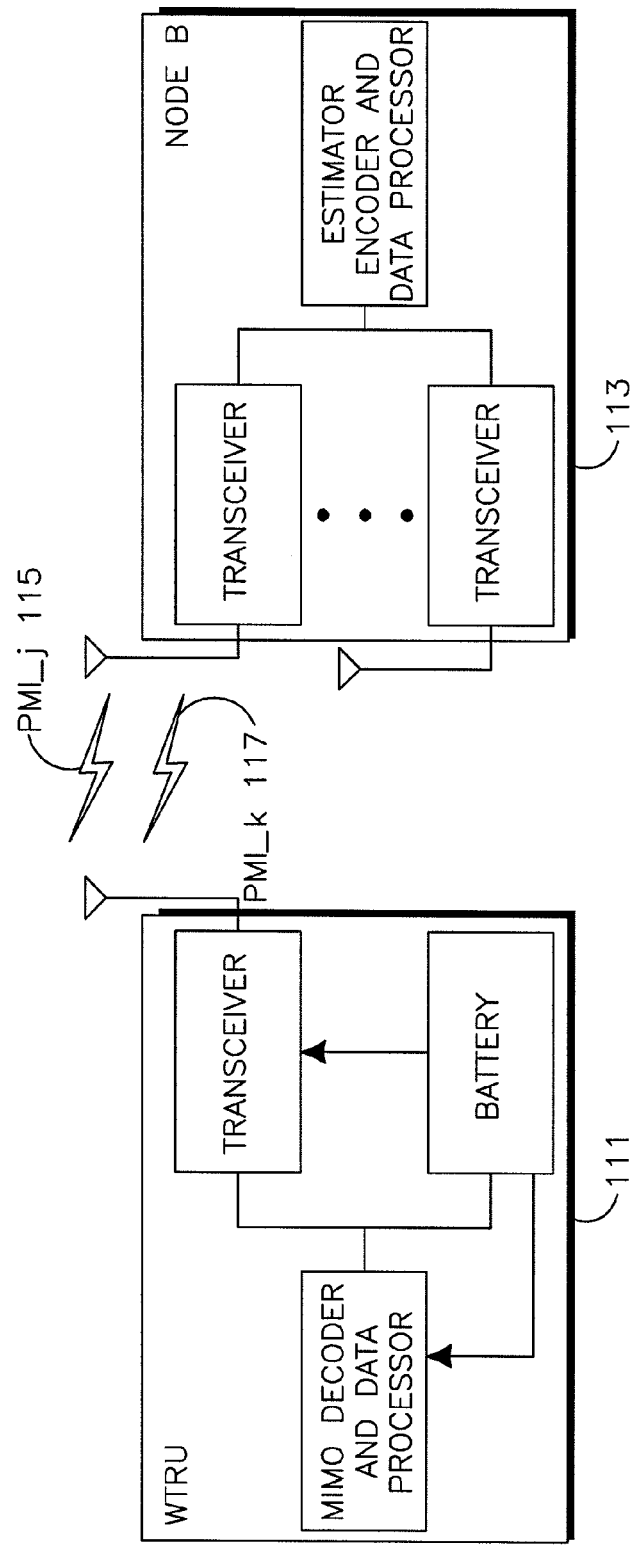

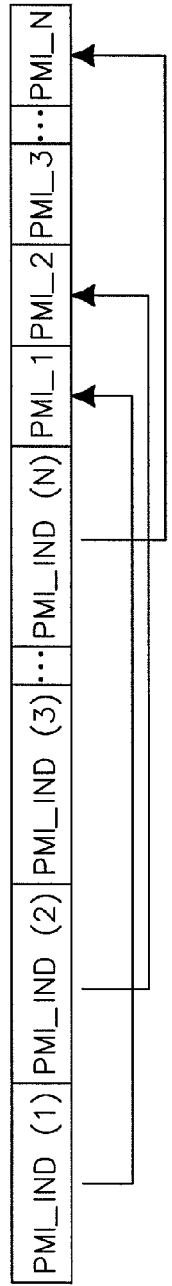
FIG.7
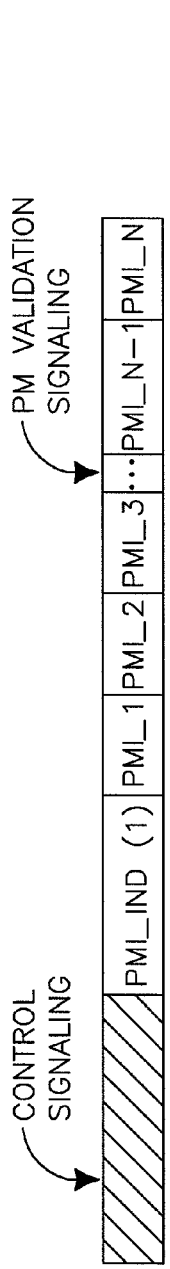
FIG.8
FIG.9
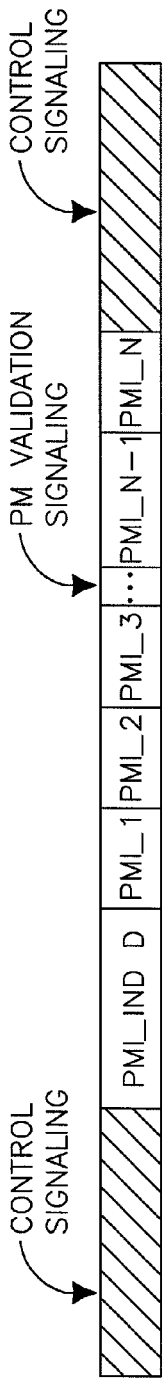
FIG.10

METHOD AND APPARATUS FOR EFFICIENT PRECODING INFORMATION VALIDATION FOR MIMO COMMUNICATIONS

CROSS REFERENCE TO RELATED APPLICATIONS

This application is a continuation of U.S. patent application Ser. No. 12/106,581, filed on Apr. 21, 2008, which claims the benefit of U.S. provisional application No. 60/913,145 and having a filing date of Apr. 20, 2007, each of which is incorporated by reference as if fully, set forth.

BACKGROUND

Third generation partnership project 3GPP and 3GPP2 are considering long term evolution LTE for radio interface and network architecture.

There is an ever-increasing demand on wireless operators to provide better quality voice and high-speed data services. As a result, wireless communication systems that enable higher data rates and higher capacities are a pressing need.

To achieve this, it is becoming increasingly popular to use multi-antenna systems in wireless communications networks to obtain advantages of increased channel capacity, spectrum efficiency, system throughputs, peak data rates and/or link reliability. Such multi-antenna systems are generically referred to as multiple-input-multiple-output (MIMO) systems but may also include multiple-input-single-output (MISO) and or single-input-multiple-output (SIMO) configurations.

Efficient signaling is essential to evolved universal terrestrial radio access (E-UTRA). A low overhead control signaling scheme can improve MIMO link performance, system capacity, system throughputs, information data rates and increased spectrum efficiency.

MIMO systems promise high spectral efficiency and have been proposed in many wireless communication standards. A lot of research is also currently underway on precoding for spatially multiplexed or space-time coded MIMO systems. Precoding is a technique used to provide increased array and/or diversity gains.

Precoding information needs to be communicated from a transmitter, (e.g., a base station), to receiver, (e.g., a wireless transmit/receive unit (WTRU)), to avoid a channel mismatch between transmitting and receiving signals. This is particularly important for MIMO data demodulation when precoding is used. When a receiver uses incorrect channel responses for data detection, significant performance degradation can occur.

Generally, precoding information may be communicated using explicit control signaling, particularly when the transmitter and receiver are restricted to the use of limited sets of antenna weights and coefficients for precoding. The limited sets of antenna weights and coefficients are sometimes referred to as precoding codebook. Explicit signaling to communicate precoding information from a transmitter to a receiver may incur large signaling overhead, particularly for a large size codebook. This signaling overhead is magnified manifold when frequency selective precoding is used.

Precoding matrix or antenna weights validation and verification is used to avoid effective channel mismatch between a transmitter and a receiver. An effective channel between a base station and a mobile handset is a channel that experiences MIMO precoding effect, and is the multiplication of channel matrix H and precoding matrix V used at an evolved Node-B (eNodeB) or a transmitter. A mismatch of the effective channel between the transmitter and the receiver causes severe performance degradation for MIMO communication systems.

FIG. 1A shows a precoding matrix or antenna weights signaling scheme. In a scheme as shown in FIG. 1, a wireless transmit/receive unit (WTRU) 111 feeds back precoding matrix indices (PMIs) or antenna weights to a base station or an eNodeB 113. Suppose that the WTRU feeds back PMI_j (having Y bits) 115 to an eNodeB. To inform the WTRU of current precoding matrix used at the eNodeB, the eNodeB sends a validation message PMI_k (Y bits) 117 to the WTRU. In case of feedback error or override, PMI_j is not equal to PMI_k. In case of no feedback error and no eNodeB override, PMI_j=PMI_k. The validation message can be sent in several forms, for example via control signaling or via reference signal.

In some systems such as Wideband Code Division Multiple Access WCDMA, there is only one PMI needed to be signaled to receiver from transmitter and vice versa. The signals are transmitted in time domain using spreading code. Signaling the exact single PMI (Y bits) to receiver does not incur too much overhead as long as the value of Y is reasonable. However in some systems such as Orthogonal frequency-division multiplexing OFDM systems, where frequency domain is additional to time domain, there may be multiple PMIs needed to be fed back from the WTRU and sent from the eNodeB for validation to support frequency selective precoding. Frequency selective precoding performs MIMO precoding per sub-band within system bandwidth. The entire system bandwidth can be divided into several sub-bands. Each sub-band consists of one or several sub-carriers. One precoding matrix is used to precode transmitted data per sub-band. In an extreme case precoding can be performed per sub-carrier if a sub-band consists of only a sub-carrier. If multiple PMIs are needed to be signaled to receiver (WTRU), then the signaling overhead could be significant. For example if there are Z PMIs to be signaled and each PMI has Y bits, then the total overhead is Z×Y bits. If Z or Y itself are large, the signaling overhead is significant.

The terminology for precoding matrix and precoding vector is interchangeable and depends upon the number of data streams to be precoded.

Each PMI is represented by L bits, wherein the value of L depends upon MIMO configurations and codebook sizes and number of data streams to be supported. WTRUs are assigned resources for communications. A resource block (RB) consists of M subcarriers, for example, M can take the value twelve (12). A resource block group (RBG) or sub-band consists of N resource blocks (N_RB), for example, N_RB=2, 4, 5, 6, 10, 25 or entire bandwidth. A system bandwidth can have one or more RBGs or sub-bands depending on the size of the bandwidth and the value of N_RB per RBG. For example, the number of RBGs per system bandwidth, N_RBG, can be one, two, four, ten, twenty and fifty. In general, the terminology RBG and sub-band is interchangeable.

The WTRU feeds back one PMI for each RBG that is configured for or selected by the WTRU for reporting. Among N_RBG RBGs for a given bandwidth, N RBGs, where 'N≤N_RBG' can be configured for or selected by a WTRU. If 'N' RBGs are configured for or selected by a WTRU for reporting precoding information, the WTRU feeds back 'N' PMIs to the eNodeB. The eNodeB sends the precoding validation message comprising 'N' PMIs back to the WTRU.

To inform the WTRU of current PMIs used at the eNodeB, the eNodeB sends 'N' PMIs back to the WTRU. The total number of bits that the eNodeB sends to the WTRU per PMI validation message is 'N_PMI×N' bits.

Table 1A shows the number of bits for PMI validation message assuming N_PMI=5 bits. The numbers are summarized for 5, 10 and 20 MHz system bandwidth. The second row is N_RB, the number of RBs per RBG. For example, the N_RB ranges from 2 to 100 for 20 MHz. The third row is N_RBG per system bandwidth, i.e., number of RBGs per system bandwidth of 5, 10 or 20 MHz, and the value of N_RBG ranges from one to fifty 50. The fourth row is the total number of bits for PMI validation signaling per validation message or grant channel.

TABLE 1A

| | 5 MHz 300 (subcarriers) | | | | 10 MHz 600 (subcarriers) | | | | | 20 MHz 1200 (subcarriers) | | | | |
|---|---|---|---|---|---|---|---|---|---|---|---|---|---|---|
| N_RB per RBG | 2 | 5 | 10 | 25 | 2 | 5 | 10 | 25 | 50 | 2 | 5 | 10 | 25 | 50 | 100 |
| N_RBG per band | 13 | 5 | 3 | 1 | 25 | 10 | 5 | 2 | 1 | 50 | 20 | 10 | 4 | 2 | 1 |
| Total #of bits for PMI signaling per validation message | 65 | 25 | 15 | 5 | 125 | 50 | 25 | 10 | 5 | 250 | 100 | 50 | 20 | 10 | 5 |

Assume 12 subcarriers per RB.
N_RB: Number of resource blocks.
N_RBG: Number of frequency blocks for pre-coding control unit to which assigned RBs belong.
N_PMI: Number of bits to represent a PMI.
Maximum total number of bits per PMI validation message = N_RBG × N_PMI.

This precoding matrix/matrices or antenna weights validation, hereinafter called "precoding information validation" or "PMI validation", may require up to 250 bits or more per validation message. Hence, this scheme is inefficient.

Therefore, it would be desirable to provide a method and apparatus to reduce the signaling overhead for PMI validation.

SUMMARY

A method and apparatus for efficient precoding information validation in a MIMO wireless communications is provided.

A wireless transmit/receive unit WTRU transmits one or multiple precoding information or precoding matrix indices (PMIs) to an eNodeB. In response, the WTRU receives from eNodeB a validation message (a PMI indicator) including a precoding confirmation message indicating whether or not there is a match to the precoding information reported by the WTRU. If there is a match between the precoding information, i.e. the precoding information are identical, a precoding validation message including a precoding confirmation message is received by the WTRU from eNodeB to confirm the precoding information that are used at eNodeB are the same as the precoding information fed back from WTRU. However, if there is a mismatch or the precoding information fed back from the WTRU are overridden by the eNodeB, the WTRU receives a validation message including a precoding confirmation/indication message from the eNodeB to indicate that the eNodeB does not use precoding information that are fed back from WTRU. The WTRU may also receive a validation message including a precoding indication message from the eNodeB to indicate the precoding information that is being used at eNodeB. Precoding validation using a precoding confirmation message is used to reduce signaling overhead.

The eNodeB sends a precoding confirmation message to a WTRU. The precoding confirmation message can be carried by a PMI indicator which indicates the state of the downlink DL precoding validation. The PMI indicator could be 1 bit or a bit sequence representing the precoding confirmation state or one or several precoding information states for the precoding validation corresponding to the WTRU precoding feedback.

The validation message or PMI indicator using precoding confirmation may consist of one or more bits. The use of PMI indicator using either a single bit or more bits helps indicate precoding information and state used and therefore helps in reducing overhead and increases efficiency.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 1A illustrates a precoding matrix or antenna weights signaling scheme;

FIGS. 4-8 illustrate various PMI validation message schemes;

FIG. 9 illustrates a control signaling scheme with a PMI validation signaling attached; and FIG. 10 illustrates a control signaling scheme with a PMI validation signaling inserted.

DETAILED DESCRIPTION

When referred to hereafter, the terminology "WTRU" includes but is not limited to a Wireless Transmit/Receive Unit (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "eNodeB" includes but is not limited to Node-B, a base station, a site controller, an access point (AP), or any other type of interfacing device capable of operating in a wireless environment.

The terminology "PMI indicator" is used to refer to an indicator responding to the feedback signal of or corresponding to the validation state of antenna weights, PMI, beamforming weights, etc. The "PMI indicator" may carry precoding confirmation message, precoding indication message, other precoding related message, or combination of them depending on various designs, schemes and purposes. Precoding indication message could be a precoding information indication message, rank override message, feedback error message, e.t.c depending on the state of precoding validation. Precoding information indication message, rank override message, etc may indicate rank information or other precoding related information.

The methods as described hereafter provide an efficient antenna weights, beamforming information or precoding information or precoding matrix indication PMI signaling and validation scheme for E-UTRA.

Figure 1B:
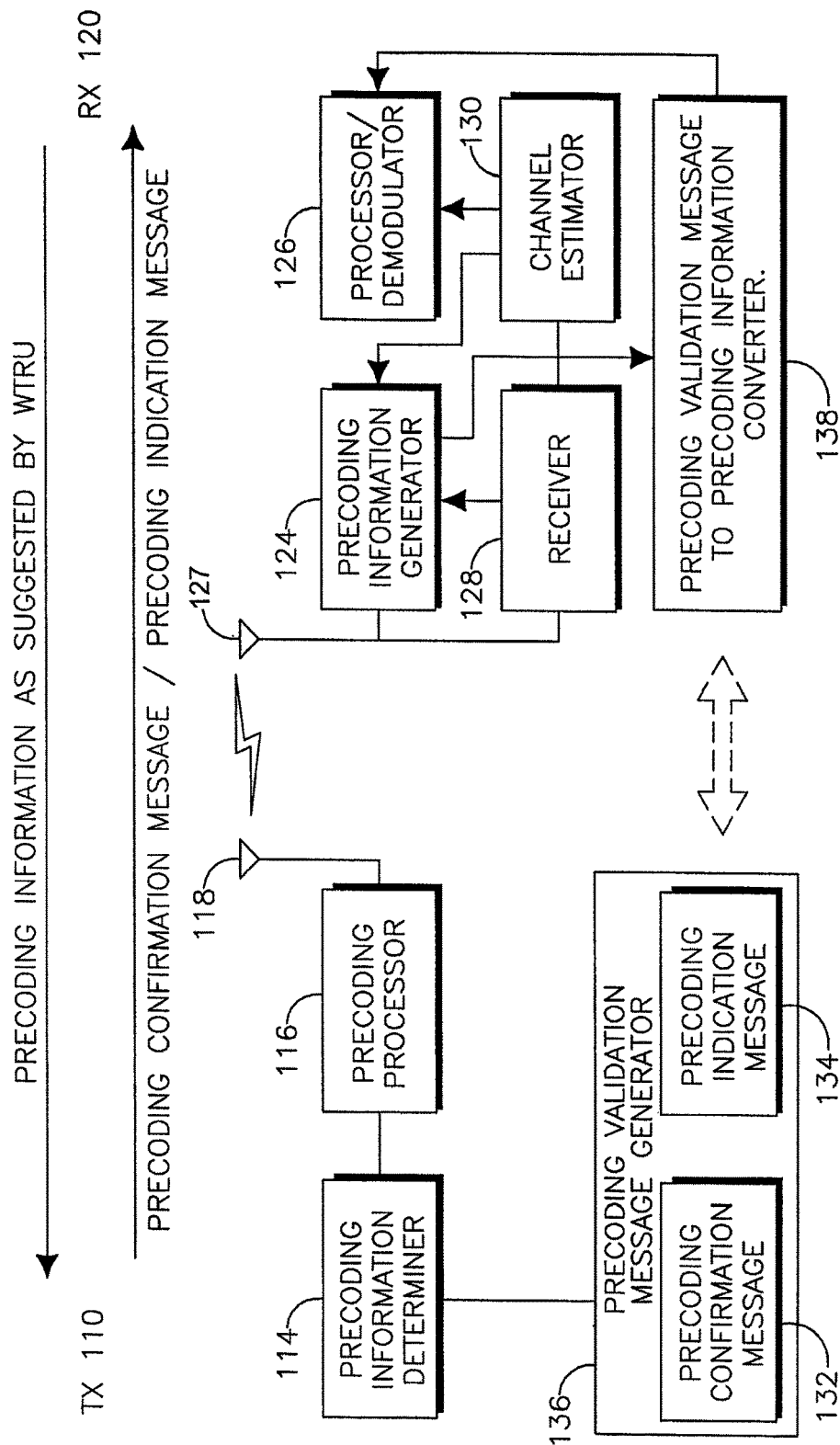
FIG. 1B shows an example block diagram of a transmitter and receiver configured to implement a precoding matrix transmission.

FIG. 1B is a functional block diagram of a transmitter 110 and receiver 120 configured to perform a method of precoding matrix indication as described hereafter. In addition to components included in a typical transmitter/receiver, transmitter 110 comprises a precoding information determiner 114, a precoding processor 116, an antenna array 118, a precoding validation message generator 136 comprising of a precoding confirmation message block 132 and precoding indication message block 134. Precoding information determiner 114 that is coupled to precoding processor 116 is used to determine a precoding information based on the received precoding feedback from precoding information generator 124 at RX 120. The output of precoding information determiner 114 is used by precoding processor 116 and transmitter 110 when transmitting a data transmission, for example, an orthogonal frequency division multiplexing (OFDM) symbols, to a receiver 120. Precoding validation message generator 136 that is coupled to precoding information determiner 114 is used to generate the validation message based on the output of precoding information determiner 114. Precoding validation message generator 136 uses the received precoding feedback signal from precoding information generator 124 and the precoding information generated from precoding information determiner 114 to determine the state of precoding validation and generate the corresponding validation message. For example, if there is a match between precoding information generated by precoding information determiner 114 and precoding information generator 124, a validation message including a precoding confirmation message is sent, otherwise a validation message including a precoding indication message is sent.

Receiver 120 comprises a receiver 128, a precoding information generator 124, a channel estimator 130, a demodulator/processor 126 and a precoding validation message to precoding information converter 138. As disclosed in greater detail hereinafter, receiver 120 comprising receiver 128, receives a transmitted OFDM block from transmitter 110, performs channel estimation by channel estimator 130, generates precoding information using the precoding information generator 124 for generating the precoding feedback signal that is then sent via antennas 127. Receiver 120 also receives precoding validation message from precoding validation message generator 136 of transmitter 110 and detects and decodes the precoding validation message and translates the precoding validation message to precoding information using the precoding validation message to precoding information converter 138. The precoding information at the output of precoding validation message to precoding information converter 138 is fed to demodulator/processor 126 for MIMO data detection, decoding and processing.

An eNodeB comprises transmitter 110, and WTRU 20 comprises receiver 120. It should be noted though that transmitter 110 may be located at a WTRU or at a base station or both, and receiver 120 may be located at either the WTRU, base station, or both.

A validation message or a PMI indicator using precoding confirmation may consist of a single bit. For example, precoding confirmation or PMI indicator can carry two possible validation messages using a single bit as follows: (1) The precoding confirmation message to inform the WTRU that precoding information used at eNodeB is exactly the same as the precoding information fed back from the WTRU, or (2) The precoding indication message to inform the WTRU that precoding information used at eNodeB is not the same as the precoding information fed back from the WTRU and this indicates that different precoding information is being used at the eNodeB.

Precoding validation message or a PMI indicator may also consist of more than one bit. Precoding validation messages may carry one precoding confirmation message and several precoding indication messages. For example, precoding validation message or PMI indicator can carry several possible messages using more than one bit as follows: (1) The precoding confirmation message to inform the WTRU that precoding information used at eNodeB is exactly the same as the precoding information fed back from the WTRU, or (2) One of several possible precoding indication messages to inform the WTRU that precoding information used at eNodeB is not the same as the precoding information fed back from the WTRU and indicates which precoding information is being used at eNodeB.

The precoding indication message may indicate the kind of precoding information used if WTRU precoding feedback has an error or is not reliable or if the WTRU's precoding feedback is overridden by eNodeB. Furthermore the precoding indication message may indicate which subset of precoding information is used if WTRU's rank information in its precoding feedback is overridden by eNodeB.

Precoding information or PMI may contain all the information related to MIMO precoding including rank information.

The method as described reduces the overhead for PMI validation by using an efficient validation message that consists of confirmation messages pertaining to the WTRU's precoding feedback. A validation message may also include an indication message. As an example, a Q-bit validation message or PMI indicator is used. Q can be greater than or equal to one for every PMI indicator. For example, if a validation message is either one confirmation message or one indication message, then Q=1 bit is sufficient. If validation message is either one confirmation message or one of the several indication messages, then Q>1 bits may be used.

The confirmation message and indication message can either be separately coded or encoded or jointly coded or encoded. In a separate coding or encoding scheme, the validation message may consist of two parts—a confirmation part and an indication part. The confirmation part usually uses one bit to carry a positive-confirmation message or a negative confirmation message. The indication part usually uses one or more bits to carry two or more indication messages. In confirmation message, a positive-confirmation message is used to inform the WTRU that precoding information used at eNodeB is exactly the same as the precoding information fed back from the WTRU. On the other hand, a negative-confirmation message is used to inform WTRU that the precoding information used at the eNodeB is not the same as the precoding information fed back from the WTRU. This indicates to the WTRU that different precoding information is being used at the eNodeB. The kind of precoding information being used at the eNodeB is indicated in the indication part of validation message. In the indication part of the validation message, the precoding information being used at the eNodeB is pointed out.

A separate coding message format having confirmation and indication parts or fields is depicted as follows:

| Validation Message. | |
| --- | --- |
| Confirmation Message | Indication Message |

In a joint coding or encoding scheme, the validation message may consist of only one part that combines confirmation and indication messages which are encoded jointly. Each of validation messages can carry either one confirmation message (positive-confirmation message) or one of the possible several indication messages. The confirmation message (positive-confirmation message) is used to inform the WTRU that precoding information used at eNodeB is exactly the same as the precoding information fed back from the WTRU. The indication message in joint coding serves two purposes—to provide negative confirmation and precoding indication at the same time. That is, the indication message is used to inform the WTRU that the precoding information used at eNodeB is not the same as the precoding information fed back from the WTRU and it also indicates the precoding information being used at the eNodeB. A joint coding message format having a single combined confirmation/indication part or field for validation message is depicted as follows:

| Validation Message |
| --- |
| Confirmation/Indication Messages |

Separate coding or encoding of confirmation and indication messages is simple. In addition most of time only confirmation message or one bit needs to be sent, therefore the efficiency is high. However, the receiver has to distinguish between "confirmation message" and "confirmation+indication messages" because they are of different lengths. This may increase the detection complexity of the receiver. To avoid the issue of different lengths between "confirmation message" and "confirmation+indication messages", a same format may be used regardless the precoding information of eNodeB and WTRU are identical or not. For example a same format for "confirmation+indication messages" may be used by "confirmation message" that has only confirmation message. Furthermore only one confirmation message and one indication message may be sent instead of sending one confirmation message and multiple indication messages in case of multiple sub-bands precoding. The scheme using only one confirmation and one indication message is a wide-band precoding or non-frequency selective precoding since only one indication message is sent corresponding to a single precoding information or matrix that is used at eNodeB for all the sub-bands. The scheme using one confirmation message and multiple indication messages is a multi-band precoding or frequency selective precoding since multiple precoding information or matrices are used for multiple sub-bands, each precoding information or matrix is used for a sub-band. By using the same format for both confirmation only message and confirmation and indication messages and using the non-frequency selective precoding when the precoding information used at eNodeB and precoding information fed back from WTRU are not identical, detection complexity at receiver is reduced or avoided. When the precoding information used at eNodeB and precoding information fed back from WTRU are identical, multi-band precoding or frequency selective precoding is used.

Joint coding combines confirmation and indication messages and can save greater bits per validation message. But, every validation message that is sent contains both confirmation and indication messages, and therefore, there are a constant number of bits that are sent consistently in a validation message. The overall efficiency may be lower for joint coding as compared to separate coding but joint coding may not increase the detection complexity of the receiver. The use of confirmation and indication messages for responding to precoding feedback using either of the separate or joint coding or encoding schemes for precoding information provides greater efficiency than the straightforward method as it uses a very high number of bits.

As another example, for Q=2 bits, using separate coding for confirmation and indication messages, confirmation part of validation message may use one bit and indication part of validation message may use the other bit. Confirmation part of validation message with bit 0 may represent the positive-confirmation message and bit 1 may represent the negative-confirmation message; indication part of validation message with bit 0 and 1 may represent indication message 1 and indication message 2 respectively which may indicate a precoding information 1 and precoding information 2 correspondingly.

For Q=2 bits, using joint coding for confirmation and indication messages, validation message with bit sequence 00 may represent a confirmation message (a positive-confirmation message); validation message with bit sequence 01, 10 and 11 may represent indication message 1, indication message 2 and indication message 3 respectively which may indicate a precoding information 1, precoding information 2 and precoding information 3 correspondingly. Validation message with bit sequence 01, 10 and 11 automatically represent the negative-confirmation message due to the joint coding or encoding of confirmation and indication messages.

Similarly for Q=3 bits, when using separate coding for confirmation and indication messages, confirmation part of validation message may use one bit and indication part of validation message may use two bits. Confirmation part of validation message with bit 0 may represent the positive-confirmation message and bit 1 may represent the negative-confirmation message; indication part of validation message with bit 00-11 may represent indication message number 1 to message number 4 respectively, that indicates the precoding information number 1 to 4 correspondingly.

Similarly for Q=3 bits when using joint coding or encoding of confirmation and indication messages, validation message with bit sequence 000 may represent the positive-confirmation message; validation message with bit sequence 001 to 111 may represent negative-confirmation message and at the same time represent the indication message number 1 to indication message number 7 respectively which indicates the precoding information number 1 to precoding information number 7 respectively.

The indication message may indicate the precoding information. Furthermore the indicate message may also indicate the subset of precoding information, precoding rules, override rules, e.t.c. For example the indication message may indicate the following: which precoding information or matrix is used (this may also include rank information), how the eNodeB overrides (e.g., which precoding information or matrix subset should be used when WTRU's rank in precoding feedback is overridden), how the eNodeB handle the case when WTRU feedback is erroneous (e.g., use the previously used precoding information that is valid). According to what the information are indicated, the indication message may have different types of message, e.g., precoding information indication type message, precoding or rank override message, feedback error message, e.t.c. Accordingly the validation message may have several types of message. The validation message having two types of messages—confirmation message and indication message is summarized in Table 1B.

TABLE 1B

| Type of Validation Message | Usage |
|---|---|
| Confirmation message | Confirm the same precoding information fed back from UE is used at eNodeB. |
| Indication message | Indicate the precoding information used at eNodeB. |

A validation message having four types of messages—confirmation message, indication message, override message and feedback error message is summarized in Table 1C.

TABLE 1C

| Type of Validation Message | Usage |
|---|---|
| Confirmation message | Confirm the same precoding information fed back from UE is used at eNodeB. |
| Indication message | Indicate the precoding information used at eNodeB. |
| Override message | Indicate the eNodeB overrides WTRU's feedback. If it is rank override, indicate which precoding information subset should be used. |
| Feedback error message | Indicate the WTRU's feedback is in error. |

The method as described above is applicable to any MIMO wireless communication system and is applicable to uplink UL and downlink DL. The terminology "PMI indicator" is used to refer to an indicator responding to the feedback signal of or corresponding to the validation state of antenna weights, PMI, beamforming weights, etc.

In general there can be one confirmation message, M1 indication messages (indicating different precoding information), M2 override messages (indicating different override rules for precoding) and M3 feedback error messages (indicating different precoding rules to handle feedback error). The total number of bits to represent the validation message is $\log_2(1+M1+M2+M3)$.

Joint coding may be performed for precoding confirmation message, precoding information or indication messages which may or may not include rank information for different designs and purposes. In addition joint coding may also be performed for rank override messages or feedback error messages or other MIMO related information and messages if override messages or feedback error messages or other MIMO related information and messages are used.

An implementation of the above scheme using either a single bit or more bits is described as follows: When there is a match between the PMI's, i.e. the PMIs are identical, only a PMI indicator is received by the WTRU. Alternatively, a PMI indicator with the PMI of the eNodeB can also be received by the WTRU. However, if there is a mismatch or the PMIs of the WTRU are overridden, the WTRU receives a PMI indicator with the PMI of the eNodeB. In this example the PMI indicator is a precoding confirmation field and PMI is a precoding indication field.

A plurality of PMIs may be sent simultaneously, and the PMIs may be partitioned into a plurality of groups.

Figure 2:
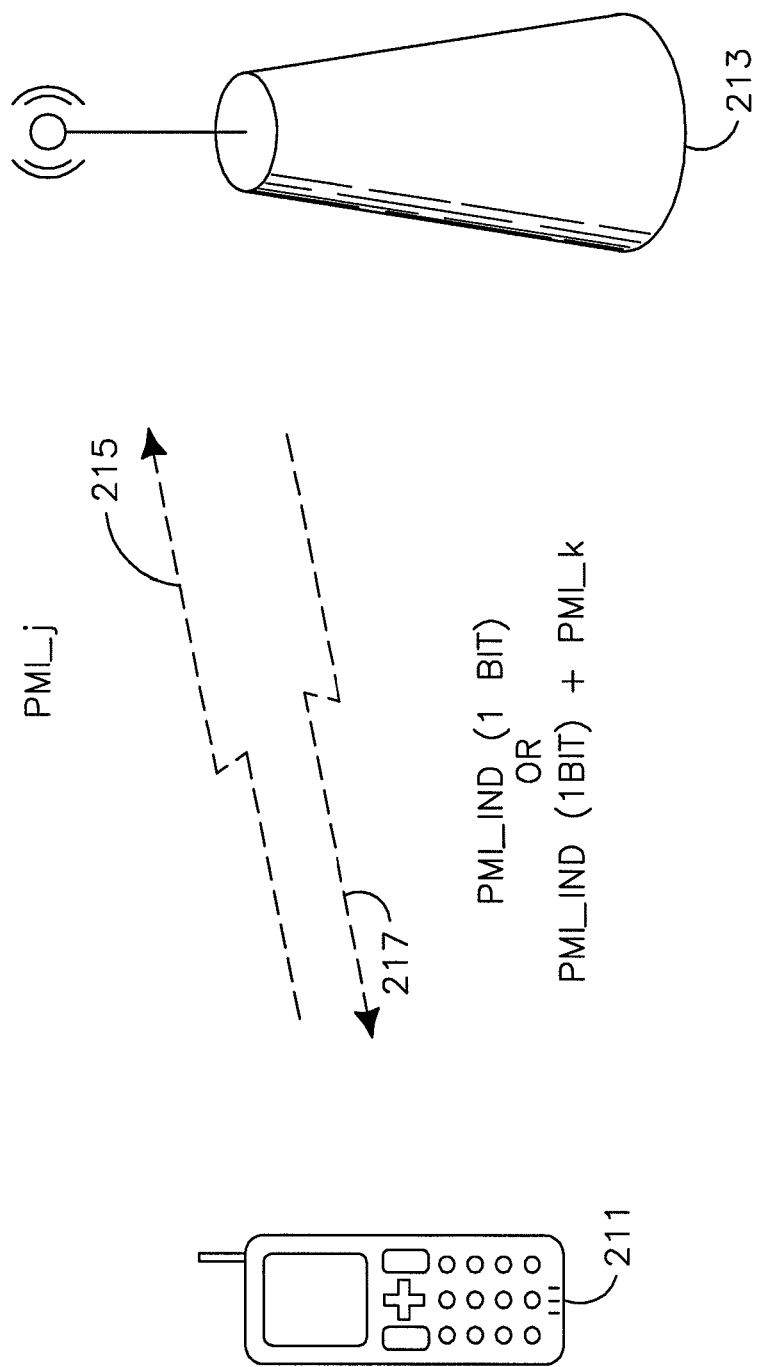
FIG. 2 illustrates a first embodiment of a signaling scheme (single PMI validation for single PMI feedback)

FIG. 2 depicts a signaling scheme in accordance with another embodiment of the method as described hereafter. A WTRU or a receiver 211 transmits a PMI or antenna weights to an eNodeB or transmitter 213, denoted as PMI_j (having Y bits) 215. To inform the WTRU or receiver of currently used precoding matrix or antenna weights at the eNodeB, the eNodeB sends a validation message back to the WTRU or receiver, denoted as PMI_k (Y bits) 217. When the eNodeB and the WTRU use the same precoding matrix or antenna weights, the eNodeB sends only a PMI indicator, PMI_IND (1 bit) 217, indicating that the precoding matrix or the antenna weights are identical, instead of sending the entire PMI or antenna weights bits. The feedback error is usually small, typically 1%. Most of the time, the eNodeB and the WTRU use the same precoding matrix or antenna weights. Therefore, most of the time, one bit PMI indicator (positive-confirmation or negative-confirmation messages) is sent.

This signaling scheme significantly reduces the signaling overhead and is summarized as follows: When PMI indicator, the PMI or antenna weight indicator is set at 1, it indicates a negative-confirmation message and that PMI or antenna weights used at the eNodeB and the WTRU are not identical. This usually occurs in the event of feedback error or the eNodeB override the WTRU's feedback.

When PMI indicator, the PMI or antenna weight indicator is set at 0, it indicates a positive-confirmation message and that PMI or antenna weights used at the eNodeB and the WTRU are identical. This usually occurs in the event of no feedback error and the eNodeB does not override the WTRU's feedback. This scheme is summarized in Tables 2A and 2B. The PMI indicator is denoted by PMI_IND.

TABLE 2A

PMI indicator using 1 bit.

| PMI_IND | State | Usage |
|---|---|---|
| 0 | Confirmation (or positive confirm) | Confirm eNodeB to use precoding information fed back from UE. |
| 1 | Not confirm (or negative confirm) | eNodeB uses different precoding information than those fed back from UE. This is usually due to feedback error or eNodeB override. This could also be due to other factors. |

TABLE 2B

Non-Frequency Selective Precoding (for non-frequency selective feedback or single PMI feedback)

| PMI_IND | Message | Usage |
|---|---|---|
| 0 | Positive-confirmation message | Confirm to use PMI_n fed back from WTRU. |
| 1 | Negative-confirmation message | Send single PMI. Send PMI_m which is a precoding matrix used at eNodeB for all the sub-bands or RBGs. i.e., the same single |

TABLE 2B-continued

Non-Frequency Selective Precoding (for non-frequency selective feedback or single PMI feedback)

| PMI_IND | Message | Usage |
|---------|---------|-------|
|         |         | precoding matrix is used for entire system bandwidth. |

The PMI indicator may also be used to indicate the beamforming matrix/matrices or vectors, antenna weights and any other matrix, vector or weights when applicable. Other notations for PMI indicator other than PMI_IND may also be used. The bit assignment for the PMI_IND above is arbitrary and any other values than '1' and '0' may be used for PMI indicator.

Figure 3A:
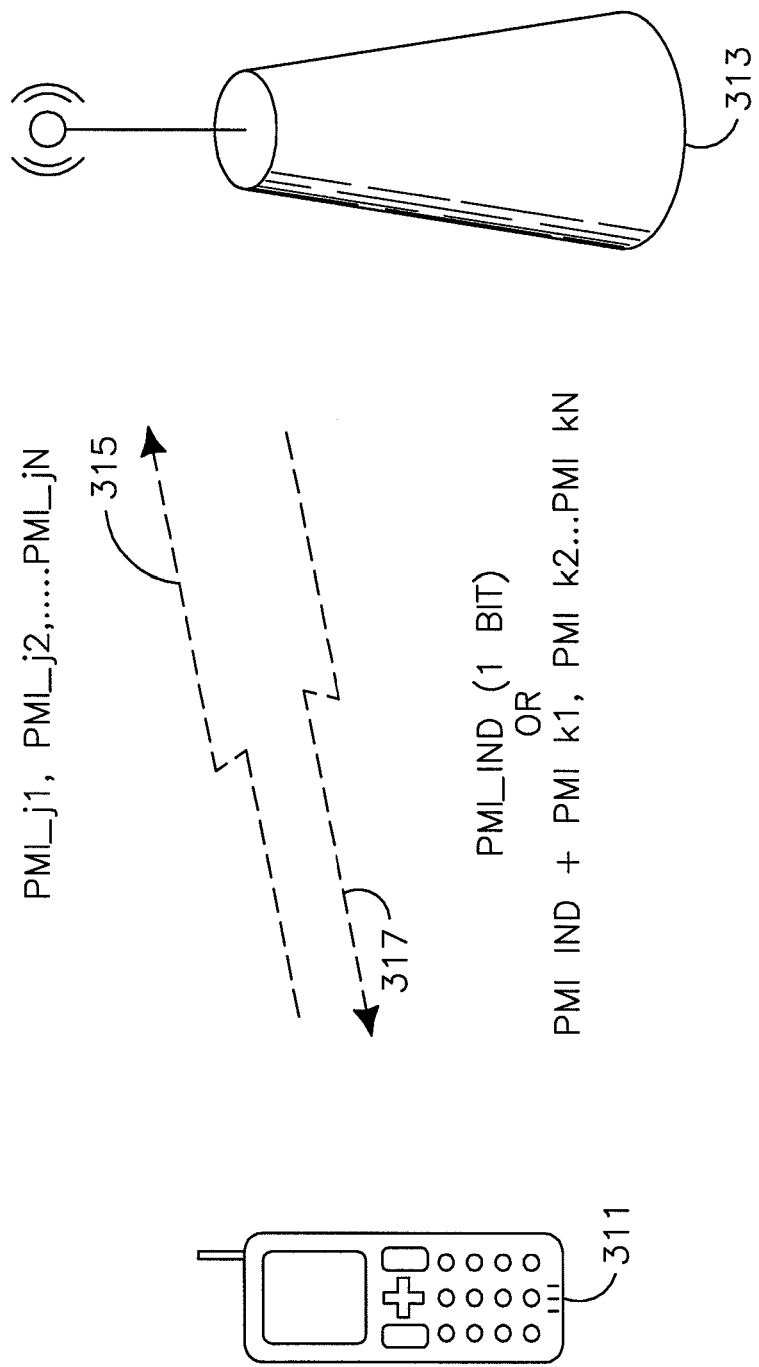
FIG. 3A illustrates a second embodiment of a signaling scheme for precoding matrix or antenna weights verification; (multiple PMI validation for multiple PMI feedback)

FIG. 3A shows a signaling scheme for precoding matrix or antenna weights validation in accordance with another embodiment. This embodiment is for an efficient signaling for multiple PMIs validation or verification. This embodiment is for the case of frequency selective channel. For example the entire system bandwidth may be divided into multiple sub-bands (or RBGs) and one PMI reported for each sub-band when there are multiple PMIs to be reported for the entire bandwidth. In this embodiment, there can be N PMIs for reporting. A WTRU or receiver 311 transmits precoding matrix indices or antenna weights information 315 to an eNodeB or transmitter 313, denoted as PMI_j1, PMI_j2, . . . , PMI_jN. To inform the WTRU 311 of currently used precoding matrices or antenna weights at the eNodeB 313, the eNodeB sends validation message 317 back to the WTRU, denoted as PMI_k1, PMI_k2, . . . , PMI_kN which corresponds to precoding feedback PMI_j1, PMI_j2, . . . , PMI_jN respectively. When the eNodeB 313 and the WTRU 311 use the same precoding matrices or same sets of antenna weights for all the sub-bands, (i.e., PMI_j1=PMI_k1, PMI_j2=PMI_k2, . . . , PMI_jN=PMI_kN), the eNodeB 313 sends only a PMI indicator (1 bit) indicating that the PMIs are identical, instead of sending all the PMIs or all sets of antenna weights bits back to the WTRU 311. The feedback error is usually small, typically 1% for design requirements. Most of the time, the eNodeB 313 and the WTRU 311 use the same precoding matrices or antenna weights. In case of no feedback error and no override, eNodeB or TX sends only PMI_IND to WTRU or RX. In case of feedback error or precoding or rank override, eNodeB or TX sends PMI_IND and precoding information to WTRU. Depending on whether frequency selective precoding is used or not, eNodeB or TX sends different amount of precoding information to WTRU. For example, if frequency selective precoding is used at eNodeB or TX, eNodeB or TX sends PMI_IND and PMI_k1, PMI_k2, . . . PMI_kN to WTRU or RX, where PMI_k1, PMI_k2, . . . PMI_kN represent N precoding matrices for N sub-bands or RBGs. If non-frequency selective precoding is used at eNodeB or TX, eNodeB or TX sends PMI_IND and a single precoding information say PMI_m, where PMI_m is a precoding matrix used for all the sub-bands or RBGs. That is, the same precoding matrix is used for all sub-bands or RBGs. This scheme is summarized in Tables 3 and 4 respectively.

TABLE 3

Frequency Selective Precoding when positive and negative confirmation (for frequency selective feedback or multiple PMIs feedback)

| PMI_IND | Message | Usage |
|---------|---------|-------|
| 0 | Positive-confirmation message | Confirm to use PMI_j1, PMI_j2, . . . , PMI_jN fed back from WTRU. |
| 1 | Negative-confirmation message | Send N PMIs. (Send PMI_k1, PMI_k2, . . . PMI_kN.) N precoding matrices are used for N sub-bands. |

TABLE 4

Frequency Selective Precoding when Positive Confirmation and Non-Frequency Selective Precoding when Negative Confirmation (for frequency selective feedback or multiple PMIs feedback)

| PMI_IND | Message | Usage |
|---------|---------|-------|
| 0 | Positive-confirmation message | Confirm to use PMI_j1, PMI_j2, . . . , PMI_jN fed back from WTRU. |
| 1 | Negative-confirmation message | Send a single PMI. Send PMI_m which is a precoding matrix used at eNodeB for all the sub-bands or RBGs. i.e., the same single precoding matrix is used for entire system bandwidth. |

Figure 3B:
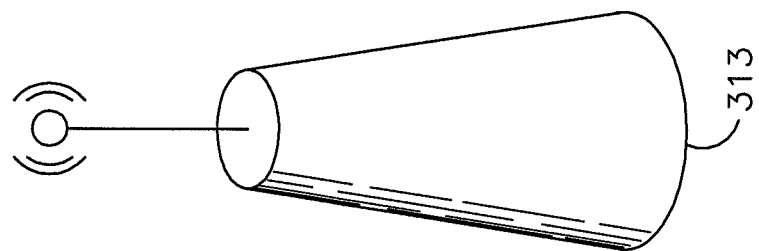
FIG. 3B illustrates another embodiment of a signaling scheme for single PMI validation for multiple PMI feedback.
Figure 3B:
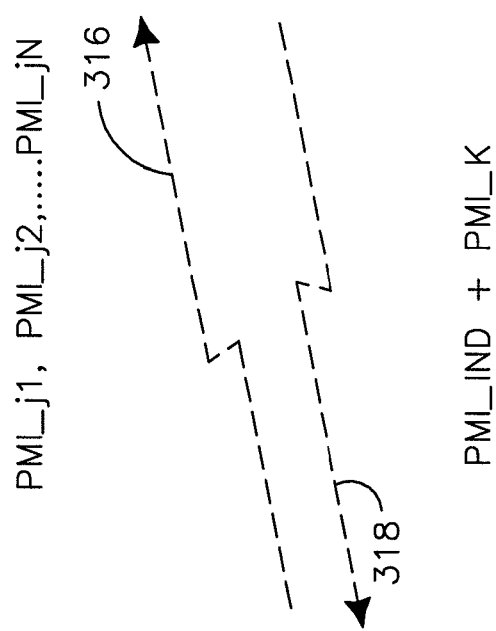
Figure 3B:
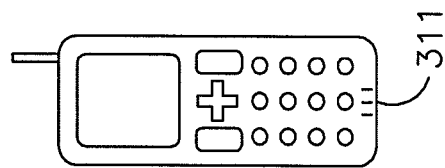

FIG. 3B shows a signaling scheme for precoding matrix or antenna weights validation in accordance with yet another embodiment. This embodiment is for an efficient signaling for multiple PMIs feedback and a validation message including a single precoding indication message. A WTRU or receiver 311 transmits precoding matrix indices or antenna weights information 316 to an eNodeB or transmitter 313, denoted as PMI_j1, PMI_j2, . . . , PMI_jN. To inform the WTRU 311 of currently used precoding matrices or antenna weights at the eNodeB 313, the eNodeB sends validation message 318 back to the WTRU, denoted as PMI_IND+PMI_k which responds to precoding feedback PMI_j1, PMI_j2, . . . PMI_jN. This is used when there is multiple PMIs feedback and a validation message with a single PMI indication message is used.

When the eNodeB 313 and the WTRU 311 use the same precoding matrices or same sets of antenna weights, the eNodeB 313 sends a confirmation message indicating that the PMIs are identical, instead of sending all the PMIs or all sets of antenna weights bits back to the WTRU 311. Otherwise the eNodeB 313 sends an indication message to WTRU 311 indicating that the PMIs are not identical. If separate coding is used, PMI_IND and PMI are sent in which PMI_IND serves positive- or negative-confirmation message and PMI serves as the indication message. In this case PMI_IND is one bit and PMI is at least one bit. If joint coding PMI_IND that contains PMI is sent, the PMI_IND serves as both, a positive or negative-confirmation and indication messages. In this case PMI_IND is at least one bit.

The validation message format with two fields can be depicted as follows:

| Validation Message Format 1 | |
|---|---|
| PMI_IND | PMI |

Furthermore for validation message using joint coding of confirmation and indication messages, the validation message format with single field can be depicted as follows:

| Validation Message Format 2 |
|---|
| PMI_IND |

In validation message format 2 the single PMI_IND field contains the combined information of PMI_IND and PMI in validation message format 1.

Yet another implementation is by use of a default precoding message instead of sending indication message or PMIs. The signaling can be done in another way wherein there is no feedback error and no override, eNodeB, TX sends only PMI_IND (positive-confirmation message) to WTRU or RX in which PMI_IND confirms that eNodeB uses the same precoding information fed back from WTRU. In case of feedback error or PMI override, eNodeB or TX sends PMI_IND (negative-confirmation message) to WTRU in which PMI_IND informs WTRU to use default or predetermined precoding indication message or information. Therefore only PMI_IND containing confirmation message is sent while indication message or PMI(s) are not sent in any case. This scheme is summarized in Table 5.

TABLE 5

Negative confirmation using default precoding indication message.

| PMI_IND | Message | Usage |
|---|---|---|
| 0 | Positive confirmation | Use precoding information fed back from WTRU. |
| 1 | Negative confirmation | Use default or predetermined precoding indication message or information. |

The PMI indicator may also be used to indicate the beamforming matrix/matrices or vectors, antenna weights and any other matrix, vector or weights when applicable. Other notations for PMI indicator other than PMI_IND may also be used. The confirmation state for the PMI_IND as positive and negative is arbitrary and any other values than positive and negative may be used for PMI indicator.

As described earlier, the signaling overhead for the PMI validation or verification may required up to 250 bits or more per validation signaling in the case of multiple RBGs and multiple PMIs each time when PMI validation messages are sent. Therefore, the signaling scheme using precoding confirmation message as described saves a significant amount of signaling overhead.

Figure 4:
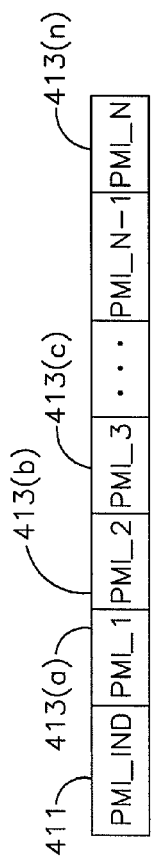

The downlink PMI indicator signaling scheme in accordance with another embodiment is summarized as follows: When PMI_IND (the PMI or antenna weight indicator) is set at 1, it indicates a negative-confirmation message and that at least one of a plurality of PMIs used at the eNodeB 313 and the WTRU 311 are not identical. This usually occurs in the event of feedback errors or when eNodeB 313 overrides the WTRU's 311 feedback. All PMIs are sent following the PMI_IND (1 bit) as shown in FIG. 4. In FIG. 4, the first element is PMI_IND 411 followed by individual PMIs 413(a) to 413 (n).

When PMI_IND (the PMI or antenna weight indicator) is set at 0, it indicates a positive-confirmation message and that all of the PMIs used at the eNodeB 313 and the WTRU 311 are identical. This usually occurs in the event of no feedback error and the eNodeB 313 does not override the WTRU's 311 feedback. PMIs are not sent, but only the PMI_IND (1 bit) 411 is sent.

Figure 5:
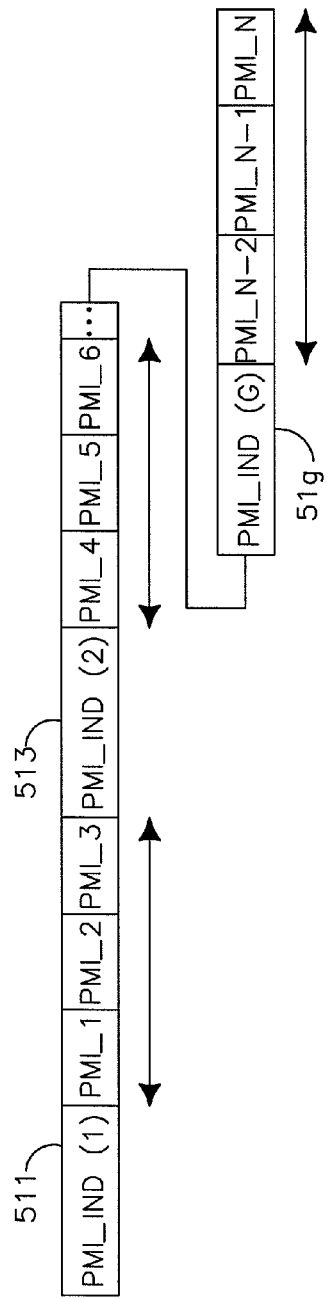

In accordance with another embodiment, PMIs are partitioned into groups; for example G groups. As shown in FIG. 5, each group has one bit to indicate whether the precoding matrices or antenna weights are the same for the eNodeB 313 and the WTRU 311. Such signaling can be implemented to have either Q bits in one indicator signaling or Q PMI indicators each of which has one bit. PMI indicators, PMI_IND(1) 511, PMI_IND(2) 513, ..., and PMI_IND(G) 51g, may be spread over the validation messages as shown in FIG. 5.

Figure 6:
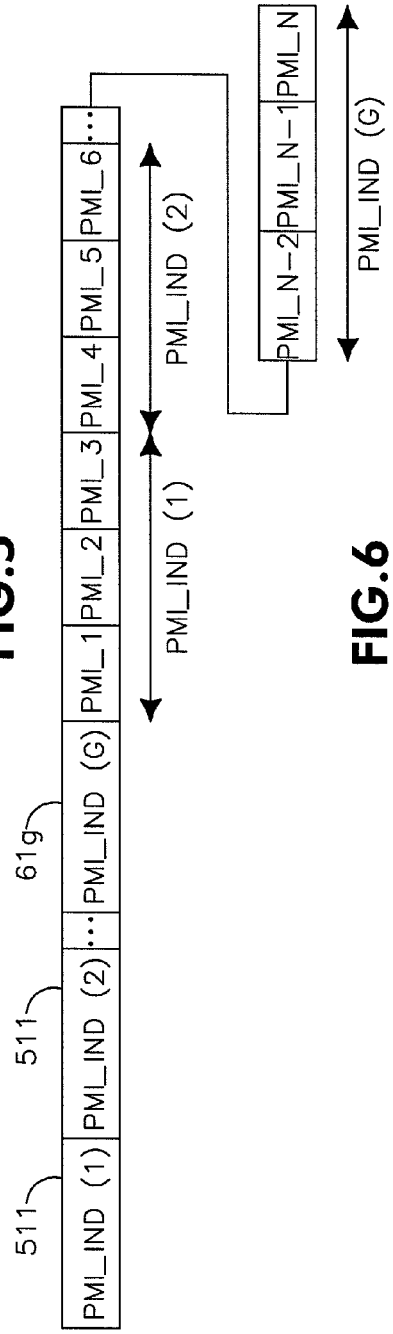

An alternate mode of grouping can be seen in FIG. 6, wherein the PMI indicators (611, 613 and 61g), PMI_IND (1), PMI_IND(2), ..., and PMI_IND(G), may be grouped in the front portion of the validation message as shown in FIG. 6.

The signaling mechanism in accordance with PMI indicators (PMI_IND(g), g=1, 2, ..., G) for group PMIs, is summarized as follows: When PMI_IND (the PMI or antenna weight indicator) for a group of WTRUs is set at 1, it indicates a negative-confirmation message and that at least one of the PMIs belonging to that group that are used at the eNodeB 313 and the WTRU 311 are not identical. This usually occurs in the event of feedback errors or the eNodeB overrides the WTRU's feedback for that PMI group. If PMI_IND (g)='1', a negative-confirmation message for the $g^{th}$ group, all the PMIs belonging to the $g^{th}$ group are sent following the PMI_IND (g) that is set to '1'. For example, in FIG. 5, if any of PMI_1, PMI_2 and PMI_3 are not the same for the eNodeB and the WTRU, PMI_IND(1) and PMI_1, PMI_2 and PMI_3 are sent by the eNodeB.

When PMI_IND the PMI or antenna weight indicator for a group of WTRUs is set at 0, it indicates a positive-confirmation message and that all of the PMIs belonging to that group that are used at the eNodeB and the WTRU are identical. This usually occurs in the event of no feedback error or the eNodeB does not override the WTRU's feedback. If PMI_IND(g)='0', a positive-confirmation message for the $g^{th}$ group, PMIs belonging to the $g^{th}$ group are not sent, but only the PMI indicator for the $g^{th}$ group is sent. The sent PMI_IND(g) is set to '0'. For example, in FIG. 5, if all of PMI_4, PMI_5 and PMI_6 are the same for the eNodeB and the WTRU, only the 1-bit PMI_IND(2) is sent by the eNodeB. Alternatively the fields reserved for the unsent PMIs can be used for sending other information or data. This increases the information or data throughput and spectrum efficiency. For example the fields reserved for PMI_4, PMI_5 and PMI_6 can be used for sending other information or data.

A special case for group PMI indicator signaling is when each group has only one PMI, i.e., G=N. In this implementation, each group has exactly one PMI. This scheme is illustrated in FIG. 7. An increase in the groups (G) may increase the signaling efficiency because only a few PMIs which are not identical need to be signaled.

In general PMI_IND can represent the messages or states that consist of bit sequence. For example PMI_IND can represent precoding confirmation message or state, precoding information message 1 or state 1, precoding information message 2 or state 2, ... and so on. This scheme is summarized in Table 6A. A similar scheme in case of an override scheme is shown in Table 6B.

TABLE 6A

| PMI_IND | Message (state) | Usage |
| --- | --- | --- |
| 000 | Precoding confirmation message | Confirm that eNodeB uses precoding information fed back from WTRU. |
| 001 | Precoding information message#1 | Inform WTRU to use precoding matrix 1. |
| 010 | Precoding information message#2 | Inform WTRU to use precoding matrix 2 |
| ... | ... | ... |
| 110 | Precoding information message#6 | Inform WTRU to use precoding matrix 6 |
| 111 | Precoding information message#7 | Inform WTRU to use precoding matrix 7 |

TABLE 6B

With rank override

| PMI_IND | Message | Usage |
| --- | --- | --- |
| 000 | Precoding confirmation message | Confirm that eNodeB uses precoding information fed back from WTRU. |
| 001 | Precoding information message#1 | Inform WTRU to use precoding matrix 1. |
| ... | ... | ... |
| 110 | Rank information override message#1 | Inform WTRU to use precoding sub-matrix 1 |
| 111 | Rank information override message#2 | Inform WTRU to use precoding sub-matrix 2 |

As an example, codebook (1) using the above scheme has four precoding vectors for rank 1 and two precoding matrices for rank 2. There are six precoding matrices/vectors in total in codebook (1) shown in Table 7.

TABLE 7

Codebook (1)

| Rank 1 | Rank 2 |
| --- | --- |
| C1 | C5 |
| C2 | C6 |
| C3 | |
| C4 | |

A corresponding PMI confirmation and indication scheme to codebook 1, when rank is jointly indicated can be seen in Table 8A.

TABLE 8A

PMI confirmation and indication scheme

| PMI_IND | Message | Usage |
| --- | --- | --- |
| 000 | Precoding confirmation message | Confirm that eNodeB uses precoding information fed back from WTRU. |
| 001 | Precoding information or indication message#1 | Inform WTRU to use precoding matrix C1. |
| ... | ... | ... |
| 101 | Precoding information or indication message#5 | Inform WTRU to use precoding matrix C5 |
| 110 | Precoding information or indication message#6 | Inform WTRU to use precoding matrix C6 |
| 111 | Reserved | Reserved or used for other purpose. |

Another scheme for codebook (1) using the above scheme, when rank is jointly indicated and rank override is indicated, the corresponding PMI confirmation and indication scheme table for rank 1, can be as shown in Table 8B.

TABLE 8B

Joint Coding for Precoding Confirmation, Indication and Rank Override Messages

| PMI_IND | Message | Usage |
| --- | --- | --- |
| 000 | Precoding confirmation message | Confirm that eNodeB uses precoding information fed back from UE. |
| 001 | Precoding information or indication message#1 | Inform UE to use precoding matrix C1. |
| 010 | Precoding information or indication message#2 | Inform UE to use precoding matrix C2 |
| ... | ... | ... |
| 110 | Precoding information or indication message#6 | Inform UE to use precoding matrix C6 |
| 111 | Rank information override message | Inform UE to use precoding matrix subset of higher rank precoding matrix |

A PMI_IND=111 as used in Table 9 indicates that eNodeB informs WTRU to use precoding matrix subset of higher rank precoding matrix. For example rank 2 precoding matrix consists of two column vectors and rank 1 precoding matrix is a precoding vector. When rank information is overridden from rank 2 to rank 1, either the first or the second column vector of rank 2 matrix can be indicated to be used.

Another scheme for codebook (1) using the above scheme, when rank is separately indicated, the corresponding PMI confirmation and indication scheme table for rank 1, can be as shown in Table 9A.

TABLE 9A

PMI confirmation and indication scheme for Rank 1 with respect to Codebook (1).

| PMI_IND | Message | Usage |
| --- | --- | --- |
| 000 | Precoding confirmation message | Confirm that eNodeB uses precoding information fed back from UE. |
| 001 | Precoding information or indication message#1 | Inform UE to use precoding matrix C1. |
| 010 | Precoding information or indication message#2 | Inform UE to use precoding matrix C2 |
| 011 | Precoding information or indication message#3 | Inform UE to use precoding matrix C3 |
| 100 | Precoding information or indication message#4 | Inform UE to use precoding matrix C4 |
| 101-111 | Reserved | Reserved or used for other purpose. |

For rank 2, corresponding to codebook (1), the PMI confirmation and indication scheme table, when rank is separately indicated, can be as shown in Table 9B.

TABLE 9B

PMI confirmation and indication scheme for Rank 2 with respect to Codebook (1).

| PMI_IND | Message | Usage |
| --- | --- | --- |
| 00 | Precoding confirmation message | Confirm that eNodeB uses precoding information fed back from WTRU. |
| 01 | Precoding information or indication message#1 | Inform WTRU to use precoding matrix C5. |
| 10 | Precoding information or indication message#2 | Inform WTRU to use precoding matrix C6 |

TABLE 9B-continued

PMI confirmation and indication scheme for Rank 2 with respect to Codebook (1).

| PMI_IND | Message | Usage |
|---|---|---|
| 11 | Reserved | Reserved or used for other purpose. |

As an example, codebook (2) has sixteen precoding vectors for rank 1 and sixteen precoding matrices for rank 2, 3 and 4. There are sixty four precoding matrices/vectors in total in codebook 2 as shown in table 10. Rank 1 precoding matrix is a column vector. Rank 1 precoding matrices are C1-C16. Rank 2 precoding matrix is a matrix consisting of two column vectors and are from and rank 2 precoding matrices are C17-C32. Rank 3 precoding matrix is a matrix consisting of three column vectors and rank 3 precoding matrices are C33-C48. Rank 4 precoding matrix is a matrix consisting of four column vectors and rank 4 precoding matrices are C49-C64. The precoding matrix for lower rank is a subset of precoding matrix in higher rank. For instance, C1 is a subset of C17 which is a subset of C33 which again is a subset of C49.

TABLE 10

Codebook 2

| Rank 1 | Rank 2 | Rank 3 | Rank 4 |
|---|---|---|---|
| C1 | C17 | C33 | C49 |
| C2 | C18 | C34 | C50 |
| C3 | C19 | C35 | C51 |
| C4 | C20 | C36 | C52 |
| C5 | C21 | C37 | C53 |
| C6 | C22 | C38 | C54 |
| C7 | C23 | C39 | C55 |
| C8 | C24 | C40 | C56 |
| C9 | C25 | C41 | C57 |
| C10 | C26 | C42 | C58 |
| C11 | C27 | C43 | C59 |
| C12 | C28 | C44 | C60 |
| C13 | C29 | C45 | C61 |
| C14 | C30 | C46 | C62 |
| C15 | C31 | C47 | C63 |
| C16 | C32 | C48 | C64 |

A corresponding table for PMI confirmation and indication scheme for Codebook (2) can be as shown in Table 11A.

TABLE 11A

Joint Coding for Precoding Confirmation, Indication, Feedback Error and Override Messages.

| PMI_IND | Message | Usage |
|---|---|---|
| 0000000 | Precoding confirmation message | Confirm that eNodeB uses precoding information fed back from WTRU. |
| 0000001 | Precoding feedback error message | Inform WTRU to use precoding matrix X. |
| 0000010 | Precoding information override message | Inform WTRU to use precoding matrix Y |
| 0000011-0010010 | Precoding information or indication message#1-64 | Inform WTRU to use precoding matrix C1 to C64 respectively. |
| 0010011-1111111 | Reserved | Reserved or used for other purpose. |

A corresponding table for PMI confirmation and indication scheme with rank overriding for Codebook (2) can be as shown in Table 11B.

TABLE 11B

Joint Coding for Precoding Confirmation, Indication, Rank Override and Feedback Error Messages

| PMI_IND | Message | Usage |
|---|---|---|
| 0000000 | Precoding confirmation message | Confirm that eNodeB uses precoding information fed back from WTRU. |
| 0000001 | Precoding feedback error message | Inform WTRU to use precoding matrix X. |
| 0000010 | Precoding information override message | Inform WTRU to use precoding matrix Y |
| 0000011-0010010 | Precoding information or indication message 1-64 | Inform WTRU to use precoding matrix C1 to C64 respectively. |
| 0010011-0010110 | Rank information override from rank 4 to rank 3 | Inform WTRU to use four precoding matrix subsets respectively. |
| 0000111-0011100 | Rank information override from rank 4 to rank 2 | Inform WTRU to use six precoding matrix subsets respectively. |
| 0011101-0100000 | Rank information override from rank 4 to rank 1 | Inform WTRU to use four precoding matrix subsets respectively. |
| 0100001-0100010 | Rank information override from rank 3 to rank 2 | Inform WTRU to use three precoding matrix subsets respectively. |
| 0100100-0100110 | Rank information override from rank 3 to rank 1 | Inform WTRU to use three precoding matrix subsets respectively. |
| 0100111-0101000 | Rank information override from rank 2 to rank 1 | Inform WTRU to use two precoding matrix subsets (select the first or the second column vector) respectively. |
| 0101001-1111111 | Reserved | Reserved or used for other purpose. |

To save the signaling overhead, one of the precoding matrices can be removed from codebook (2). As an example, if C64 or one of the other matrices is removed then the scheme reduces to the scheme as shown in Table 11C.

TABLE 11C

Modified Joint Coding for Precoding Confirmation and Indication Messages.

| PMI_IND | State | Usage |
|---|---|---|
| 000000 | Precoding confirmation message | Confirm that eNodeB uses precoding information fed back from WTRU. |
| 000001-111111 | Precoding information or indication message 1-63 | Inform WTRU to use precoding matrix C1 to C63 respectively. |

When each group has only one PMI (the PMI or antenna weight indicator) and the PMI_IND is set at (n)=1, it indicates that the $n^{th}$ PMI that are used at the eNodeB and the WTRU are not identical. This usually occurs in the event of feedback errors or the eNodeB overrides the WTRU's feedback. The nth PMI is sent. For example, in FIG. 8, if PMI_n is not the same for the eNodeB and the WTRU, PMI_IND(n) and PMI_n are sent by the eNodeB. This increases signaling efficiency.

When each group has only one PMI the PMI or antenna weight indicator and the PMI_IND is set at n=0, it indicates that the $n^{th}$ PMIs that are used at the eNodeB and the WTRU are identical. This usually occurs in the event of no feedback error and the eNodeB does not override the WTRU's feedback. The $n^{th}$ PMI is not sent, but only PMI_IND for the nth PMI, i.e., PMI_IND(n) is sent. For example, in FIG. 8, if PMI_n is the same for the eNodeB and the WTRU, only the 1-bit PMI_IND(n) is sent by the eNodeB.

A PMI indicator may be sent along with, attached to, or embedded, in the existing control signaling. FIG. 9 shows that PMI validation signaling is attached to a control signaling. FIG. 10 shows that PMI validation signaling is inserted in a control signaling. Alternatively, the PMI indicator may be sent using a separate signaling or a stand alone signaling.

The PMI validation messages may be signaled to the WTRU via a control signaling or a dedicated reference signal (RS). Alternatively part of validation message may be sent via control signaling and part of validation message may be sent via dedicated reference signal. For example precoding confirmation part may be sent via control signaling and precoding indication part may be sent via dedicated reference signal. The PMI indicator signaling may be applied to both control signaling or dedicated reference signal and be used to reduce the amount of control signaling overhead or dedicated RS overhead. When dedicated reference signals are used to send the PMI validation messages, several forms for dedicated reference signals may be used, such as precoded pilots. The use of the PMI indicator to reduce dedicated RS is described as follows.

New downlink PMI indicator signaling for dedicated reference signal

When the PMI_IND is set to 1 (negative-confirmation message), it indicates that at least one of PMIs multiple used at the eNodeB and the WTRU are not identical. This usually occurs in the event of feedback errors or the eNodeB overrides the WTRU's feedback. All dedicated reference signals that carry PMIs are sent by the eNodeB. PMI_IND is set to '1' and is also sent by the eNodeB.

When the PMI_IND is set to 0 (positive-confirmation message), it indicates that all of the PMIs (multiple) used at the eNodeB and the WTRU are identical. This usually occurs in the event of no feedback error and the eNodeB does not override the WTRU's feedback. All dedicated reference signals that carry PMIs are not sent by the eNodeB, but only 1-bit PMI_IND that is set to '0' is sent by the eNodeB.

Most of the time all of the PMIs multiple used at the eNodeB and the WTRU are identical and dedicated reference signals are not transmitted, but only the PMI_IND one bit that is set to '0' is sent by the eNodeB. Therefore, this signaling scheme too, significantly reduces the overhead of dedicated reference signals.

PMI indicator signaling in accordance with the present invention may be applied to both single user SU MIMO and multi-user MU MIMO for reduced signaling overhead. In SU-MIMO, only PMI indicator for one WTRU is sent by the eNodeB in a sub-band or a frequency and time resource. In MU-MIMO, multiple PMI indicators for multiple WTRUs that share the same sub-band or the same frequency and time resource are sent by the eNodeB. It is, therefore, a simple extension from SU-MIMO.

In MU-MIMO, it is assumed that K WTRUs exist. An eNodeB sends multiple PMI validation signaling each of which has one or multiple PMIs for each WTRU, WTRU 1, WTRU 2, . . . , WTRU K. The eNodeB sends multiple PMI indicators to the WTRUs. Each WTRU receives one PMI indicator if no group PMI is used as shown in FIG. 4, or multiple PMI indicators if group PMIs is used for the WTRU as shown in FIGS. 5 and 6 or 7 and 8.

In the case that PMIs are the same at the eNodeB and the $k^{th}$ WTRU, the eNodeB sends 1-bit PMI indicator to the $k^{th}$ WTRU. In case that PMIs are NOT the same for the eNodeB and the $k^{th}$ WTRU, the eNodeB sends PMI indicator denoted by $PMI\_IND^{(k)}$, and PMIs denoted by $PMI^{(k)}$ of the $k^{th}$ WTRU to the $k^{th}$ WTRU.

For example if PMIs are not the same for the eNodeB and the first WTRU but the same for all other WTRUs, then 1 bit $PMI\_IND^{(1)}$ and $PMI^{(1)}$ are sent to the first WTRU by the eNodeB and 1-bit $PMI\_IND^{(k)}$ for k=2, 3, . . . K are sent to all other WTRUs by the eNodeB. Alternatively in MU-MIMO, the eNodeB sends multiple PMI indicators each for one group of WTRUs. The eNodeB may also send one PMI indicator for all WTRUs. For MU-MIMO, the precoding schemes and usage can be generalized as described earlier.

For two users simultaneously supported in the same RB or RBG, it is assumed there is one stream per user, i.e., each WTRU sees rank 1 transmission for itself. Further suppose there are eight beamforming vectors C1, C2, . . . , C8 in the beamforming codebook. Table 12 describes this scheme: If PMI_IND=0 (positive-confirmation message), it indicates eNodeB confirms that WTRU's feedback is used at eNodeB ($C_{desired}$). A 3-bit PMI indicates seven possible interfering beamforming vectors of the other user, $C_j$, j=1, 2, . . . , 8 and $C_j \neq C_{desired}$. One bit combination (111) is reserved. If PMI_IND=1, it indicates eNodeB will not use WTRU's feedback and a different beamforming vector will be used. A 3-bit PMI indicates eight possible beamforming vectors ($C_j$, j=1, 2, . . . , 8) for the desired user. There is no separate indication for interfering beamforming vector unless signaling overhead is allowed to increase.

TABLE 12

Separate Coding for Confirmation and Indication Messages

| PMI_IND (1 bit) (Confirmation Message) | | PMI (3 bits) (Indication Messages) |
|---|---|---|
| 0 | 000-110 | $C_j$, for j = 1, 2, . . . , 8, and $C_j \neq C_{desired}$ |
|   | 111 | Reserved |
| 1 | 000 | C1 |
|   | 001 | C2 |
|   | 010 | C3 |
|   | 011 | C4 |
|   | 100 | C5 |
|   | 101 | C6 |
|   | 110 | C7 |
|   | 111 | C8 |

Another option is the use of default beamforming vector for desired user when PMI_IND is 1 (negative-confirmation message) and use 3-bit PMI to indicate seven possible interfering vectors similar to the case when PMI_IND=0.

Similarly, for a four user MU-MIMO and rank 1 per user, a scheme is described in table 13.

TABLE 13

Separate Coding for Confirmation and Indication Messages

| PMI_IND (1 bit) | | PMI (6 bits) |
|---|---|---|
| 0 | 000000-100010 | 35 combinations ($C_i$, $C_j$, $C_k$), for i, j, k = 1, 2, . . . , 8, i < j < k and $C_i$, $C_j$, $C_k \neq C_{desired}$ |
|   | 100011-111111 | reserved |

TABLE 13-continued

Separate Coding for Confirmation and Indication Messages

| PMI_IND (1 bit) | | PMI (6 bits) |
|---|---|---|
| 1 | 000-111 (First 3 bits indicate the desired beamforming vector) | $C_i$, i = 1, 2, . . . , 8 |
| | 000-111 (Last 3 bits indicate the interference vector combinations) | 8 combinations ($C_i$, $C_j$, $C_k$), for i, j, k = 1, 2, . . . , 8, i < j < k and $C_i$, $C_j$, $C_k \neq C_{desired}$ |

If some kind of restriction is imposed, the number of vector combinations can be reduced and thus number of bits can be reduced. For example, if the rule restricts only certain combinations are allowed, for instance $C_1$, $C_2$, $C_3$, $C_4$ can be combined together as a group, $C_5$, $C_6$, $C_7$, $C_8$ can be combined together as a group, and the group $C_1$, $C_2$, $C_3$, $C_4$ cannot be combined with the group $C_5$, $C_6$, $C_7$, $C_8$; for example C1 can be combined with C2, C3, or C4 but cannot be combined with C5, C6, C7, or C8. Combination restriction requirements may be rules to meet unitary properties or unitary beamforming requirement.

An example, assuming C1 is the beamforming vector for the desired user and that the restriction rule is used. The vector combinations can be reduced to seven combinations. For two users, only combinations [C1, C2], [C1, C3] and [C1, C4] are allowed. For three users only [C1, C2, C3], [C1, C2, C4] and [C1, C3, C4] are allowed. For four users only [C1, C2, C3, C4] is allowed. Table 14 summarizes this particular scheme with restrictions:

TABLE 14

Beamforming Vector Combinations (Assuming C1 is the Desired Vector)

| Two WTRUs | S1 = (C1, C2), S2 = (C1, C3), S3 = (C1, C4) |
| Three WTRUs | S4 = (C1, C2, C3), S5 = (C1, C2, C4), S6 = (C1, C3, C4) |
| Four WTRUs | S7 = (C1, C2, C3, C4) |

Similar tables can be built for different beamforming vectors other than C1 used for desired user. The PMI confirmation and indication messages can be jointly coded and the corresponding PMI confirmation and indication scheme can be the following: If PMI_IND=000, confirm WTRU's feedback. If PMI_IND=001, inform WTRU that C2 is interfering beamforming vector. If PMI_IND=010, inform WTRU that C3 is interfering beamforming vector and so on as shown in the table 16. If PMI_IND=111, inform WTRU that C2, C3 and C4 are interfering beamforming vectors. This is shown in the following table.

TABLE 15

Joint Coding for Precoding Confirmation and Indication Messages

| PMI_IND (Confirmation/Indication Messages) | Messages or States |
|---|---|
| 000 | Confirm |
| 001 | C2 |
| 010 | C3 |
| 011 | C4 |
| 100 | C2, C3 |
| 101 | C2, C4 |

TABLE 15-continued

Joint Coding for Precoding Confirmation and Indication Messages

| PMI_IND (Confirmation/Indication Messages) | Messages or States |
|---|---|
| 110 | C3, C4 |
| 111 | C2, C3, C4 |

Another alternative is to have PMI_IND=000 as confirmation message and PMI_IND=001-111 as indication messages to indicate the seven possible desired vectors. The seven vectors or matrices are selected or pre-selected from C1-C8. Similar tables can be built for different beamforming vectors other than C1 used for a desired user.

Joint coding may be performed for precoding confirmation message, precoding information or indication messages which may or may not include rank information for different designs and purposes. In addition joint coding may also be performed for rank override messages or feedback error messages or other MIMO related information and messages.

Figure 11:
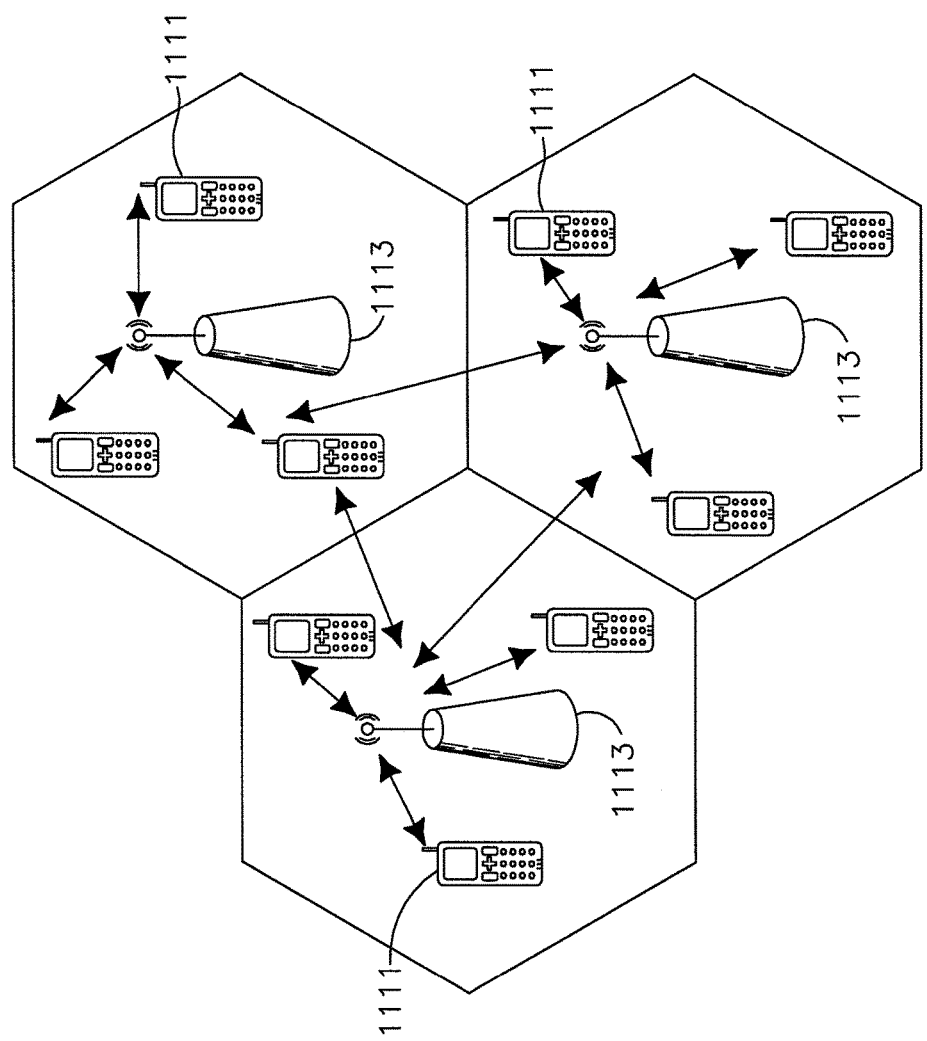
FIG. 11 shows a wireless communication system with multiple NodeBs in communication with various WTRUS

FIG. 11 shows a wireless communication system with multiple eNodeBs 1113 implementing the embodiments as described. Each eNodeB 1113 provides communication coverage for a particular geographic area commonly referred to as cells and shown as idealized hexagons. The term "cell" can refers to its coverage area depending on the context in which the term is used. To improve system capacity, an eNode B coverage area may be partitioned into multiple smaller areas, e.g., three smaller areas. WTRUs 1111 may be dispersed throughout the coverage area.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory ROM, a random access memory RAM, a register, cache memory, semiconductor memory devices, magnetic media such as internal hard disks and removable disks, magneto-optical media, and optical media such as CD-ROM disks, and digital versatile disks DVDs.

Suitable processors include, by way of example, a general purpose processor, a special purpose processor, a conventional processor, a digital signal processor DSP, a plurality of microprocessors, one or more microprocessors in association with a DSP core, a controller, a microcontroller, Application Specific Integrated Circuits ASICs, Field Programmable Gate Arrays FPGAs circuits, any other type of integrated circuit IC, and/or a state machine.

A processor in association with software may be used to implement a radio frequency transceiver for use in a wireless transmit receive unit WTRU, Wireless Transmit/Receive Unit WTRU, terminal, base station, radio network controller RNC, or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated FM radio unit, a liquid crystal display LCD display unit, an organic light-emitting diode OLED display unit, a digital music player, a media player, a video game player module, an Internet browser, and/or any wireless local area network WLAN module.

What is claimed is:

1. A method of decoding data received by a Wireless Transmit/Receive Unit (WTRU), the method comprising:
   sending, by the WTRU to an evolved Node B (eNB), a codebook value representing a multi-column precoding matrix, as feedback;
   receiving, by the WTRU via the eNB, control signaling including a multi-bit indicator;
   determining, by the WTRU based on the multi-bit indicator, a rank and precoding information for decoding by the WTRU; and
   decoding, by the WTRU, the data received via the eNB using the determined precoding information,
   wherein:
   on condition that the multi-bit indicator corresponds to a first value, the rank is one and the precoding information is based on a first column of the multi-column precoding matrix represented by the codebook value sent in the feedback,
   on condition that the multi-bit indicator corresponds to a second value, the rank is one and the precoding information is based on the second column of the multi-column precoding matrix represented by the codebook value sent in the feedback, and
   on condition that the multi-bit indicator corresponds to a third value, the rank is greater than one and the precoding information is based on a predetermined precoding matrix that is not sent in the feedback.

2. The method of claim 1, further comprising on condition that the multi-bit indicator corresponds to a fourth value, the rank is greater than one and the precoding information is based on a plurality of columns of the multi-column precoding matrix represented by the codebook value sent in the feedback, wherein the decoding of the received data uses the precoding information determined based on the plurality of columns of the multi-column precoding matrix represented by the codebook value sent in the feedback.

3. The method of claim 1, further comprising translating the codebook value sent in the feedback to the precoding information for decoding of the received data.

4. The method of claim 1, wherein:
   the sending of the feedback includes sending a suggested rank for communications with the eNB; and
   on condition that the multi-bit indicator corresponds to the first value or the second value, determining, by the WTRU, that the eNB has overridden the suggested rank from the WTRU for communication with the eNB.

5. A Wireless Transmit/Receive Unit (WTRU) configured to decode received data, comprising:
   a transmitter/receiver unit configured to:
     send, to an evolved Node B (eNB), a codebook value representing a multi-column precoding matrix, as feedback, and
     receive, via the eNB, control signaling including a multi-bit indicator; and
   a processor configured to:
     determine, by the WTRU based on the multi-bit indicator, a rank and precoding information associated with the WTRU, and
     decode the data received via the eNB using the determined precoding information,
   wherein:
   on condition that the multi-bit indicator corresponds to a first value, the rank is one and the precoding information is based on a first column of the multi-column precoding matrix represented by the codebook value sent in the feedback,
   on condition that the multi-bit indicator corresponds to a second value, the rank is one and the precoding information is based on a second column of the multi-column precoding matrix represented by the codebook value sent in the feedback, and
   on condition that the multi-bit indicator corresponds to a third value, the rank is greater than one and the precoding information is based on a predetermined precoding matrix that is not sent in the feedback.

6. The WTRU of claim 5, wherein on condition that the multi-bit indicator corresponds to a fourth value, the rank is greater than one and the precoding information is based on a plurality of columns of the multi-column precoding matrix represented by the codebook value sent in the feedback.

7. The WTRU of claim 5, wherein the processor is configured to translate the codebook value sent in the feedback to the precoding information to decode the received data.

8. The WTRU of claim 1, wherein:
   the transmitter/receiver unit configured to sending a suggested rank for communication with the eNB; and
   the processor is configured to, on condition that the multi-bit indicator corresponds to the first value or the second value, determine that the eNB has overridden the suggested rank from the WTRU for communication with the eNB.

9. A network entity configured to signal control information, comprising:
   a transmitter/receiver unit configured to receive, from a wireless transmit/receive unit (WTRU), a codebook value representing a multi-column precoding matrix and a suggested rank of greater than one, as feedback; and
   a processor configured to:
     determine whether to assign the suggested rank of greater than one, which was suggested by the WTRU in the feedback, or a rank of one for communication with the WTRU, and
     generate control signaling including a multi-bit indicator that indicates to the WTRU: (1) on condition that the multi-bit indicator corresponds to a first value, the assigned rank is one and precoding information is based on a first column of the multi-column precoding matrix represented by the codebook value sent in the feedback; (2) on condition that the multi-bit indicator corresponds to a second value, the assigned rank is one and the precoding information is based on a second column of the multi-column precoding matrix represented by the codebook value sent in the feedback; (3) on condition that the multi-bit indicator corresponds to a third value, the assigned rank is greater than one and the precoding information is based on a predetermined precoding matrix that is not sent in the feedback,
   wherein the transmitter/receiver unit is configured to send, to the WTRU, the generated control signaling including the multi-bit indicator.

10. The network entity of claim 9, wherein on condition that the multi-bit indicator corresponds to a fourth value, indicating to the WTRU the rank is greater than one and the precoding information is based on a plurality of columns of the multi-column precoding matrix represented by the codebook value sent in the feedback.

11. The network entity of claim 9, wherein the transmitter/receiver unit is configured to send to the WTRU data coded in accordance with the precoding information.

\* \* \* \* \*